United States Patent [19]

Oksanen et al.

[11] Patent Number: 6,041,234

[45] Date of Patent: *Mar. 21, 2000

[54] METHOD AND APPARATUS FOR REGISTERING A RADIO TELEPHONE SUBSCRIBER UNIT WHEREIN THE SUBSCRIBER UNIT REMAINS TUNED TO THE REGISTERING CHANNEL AFTER SUCCESSFUL REGISTRATION

[75] Inventors: Markku Tapio Oksanen, Salo, Finland; Juha Peranto, Irving, Tex.; Martti Ensio Vuorio, Halikko, Finland

[73] Assignee: Nokia Mobile Phones Limited, Salo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/637,407

[22] Filed: Apr. 25, 1996

[51] Int. Cl.$^7$ ...................................... H04Q 7/22
[52] U.S. Cl. .......................... 455/434; 455/435; 455/515; 455/525
[58] Field of Search ...................................... 455/435, 436, 455/437, 438, 443, 444, 432, 433, 434, 515, 517, 524, 525

[56] References Cited

U.S. PATENT DOCUMENTS

| | | | |
|---|---|---|---|
| 4,775,999 | 10/1988 | Williams | 379/59 |
| 5,020,091 | 5/1991 | Krolopp et al. | 379/58 |
| 5,046,082 | 9/1991 | Zicker et al. | 379/59 |
| 5,109,403 | 4/1992 | Sutphin | 379/59 |
| 5,155,860 | 10/1992 | MClure | 455/89 |
| 5,233,656 | 8/1993 | Langrand et al. | 380/23 |
| 5,276,729 | 1/1994 | Higuchi et al. | 379/58 |
| 5,297,191 | 3/1994 | Gerszberg | 379/59 |
| 5,297,192 | 3/1994 | Gerszberg | 379/59 |
| 5,343,494 | 8/1994 | Averst et al. | 375/1 |
| 5,475,862 | 12/1995 | Sawyer | 455/435 |
| 5,517,673 | 5/1996 | Fehnel | 455/515 X |

FOREIGN PATENT DOCUMENTS

| | | |
|---|---|---|
| 2163937 | 6/1996 | Canada . |
| 2 249 923 | 5/1992 | United Kingdom . |
| WO 92/17943 | 10/1992 | WIPO . |

OTHER PUBLICATIONS

"Digital Opens the Door Over–the–Air Activation", Jim Carden, Cellular Business, Jan. 1994.

*Primary Examiner*—Wellington Chin
*Assistant Examiner*—Philip J. Sobutka
*Attorney, Agent, or Firm*—Perman & Green, LLP

[57] ABSTRACT

Disclosed is a method for operating a radio telephone subscriber unit or mobile station (10) to register with a cellular system. The method includes the steps of determining from registration-related information (REGID) that is received from the cellular system that the subscriber unit must register with the cellular system; selecting a channel on which to send a registration message to the cellular system; transmitting the registration message to the cellular system on the selected channel; determining that the registration message was accepted by the cellular system; and, for a case where cellular system paging channels are in a same set of control channels as cellular system access channels, remaining tuned to the selected channel until a receipt of next registration-related information from the cellular system. For the case where the registration-related information includes a value of REGID, the method may include a further step of modifying a value of NXTREG with the received REGID and a value of REGINCR.

20 Claims, 4 Drawing Sheets

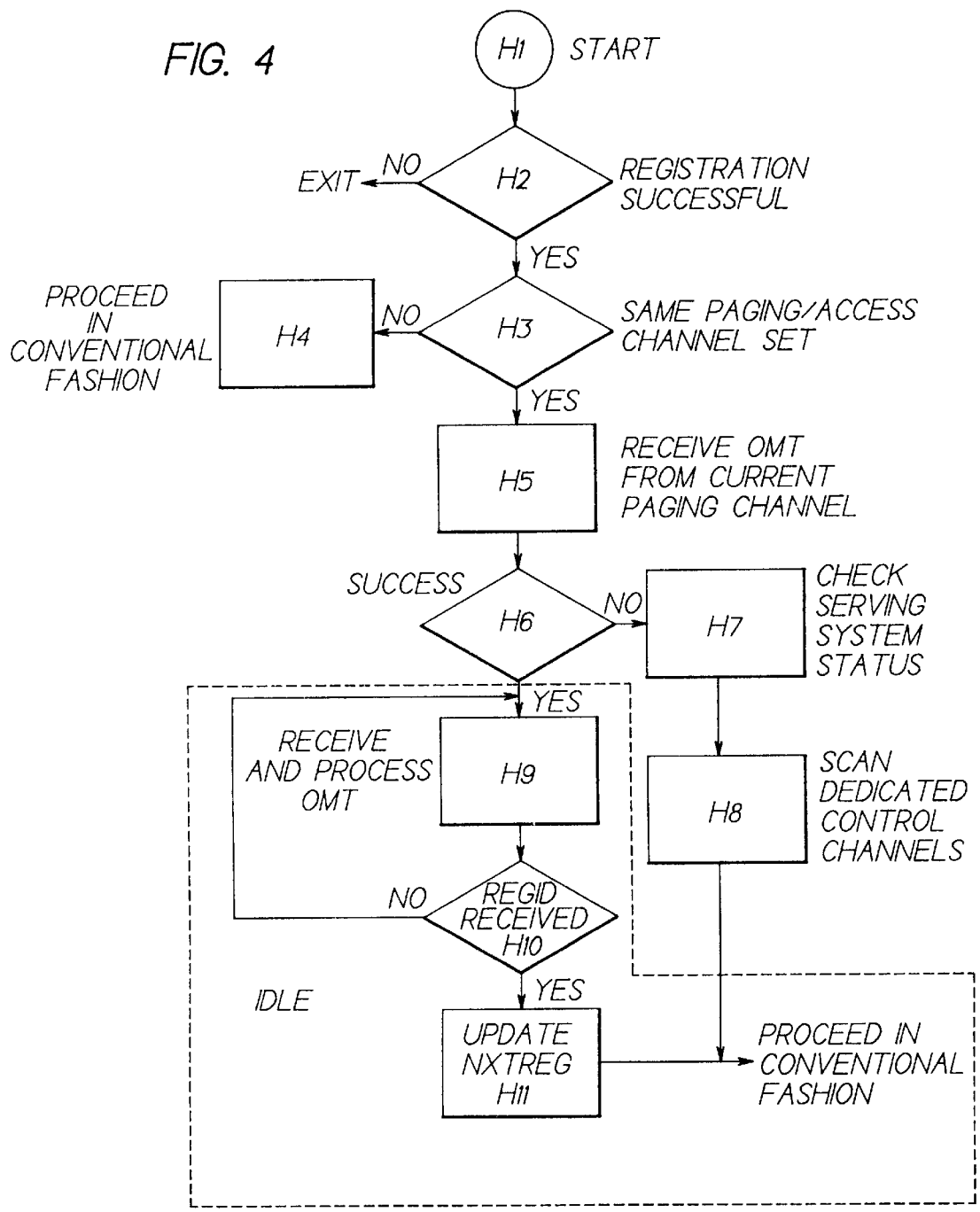

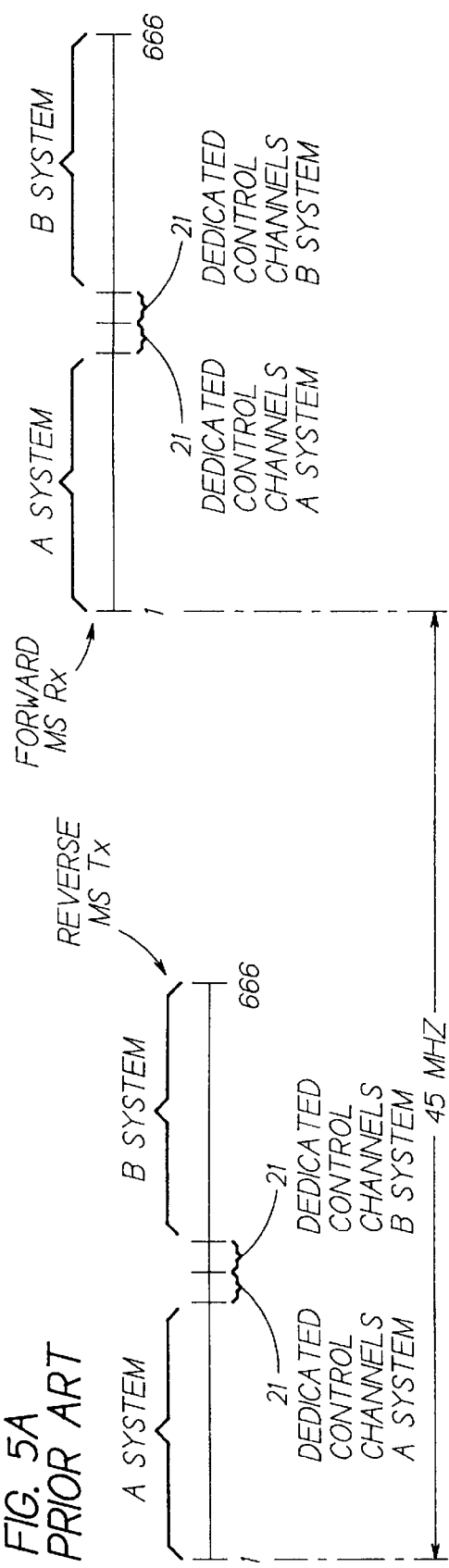
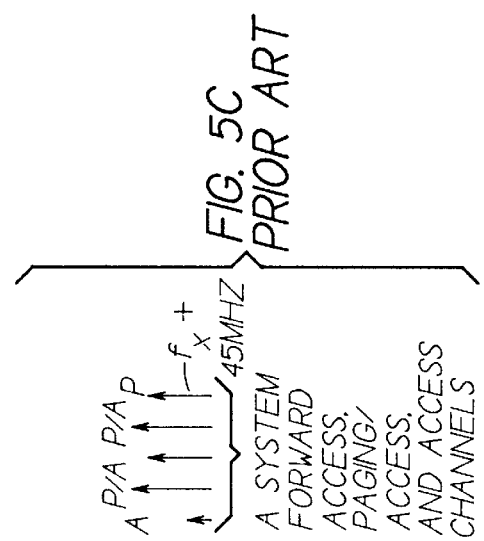
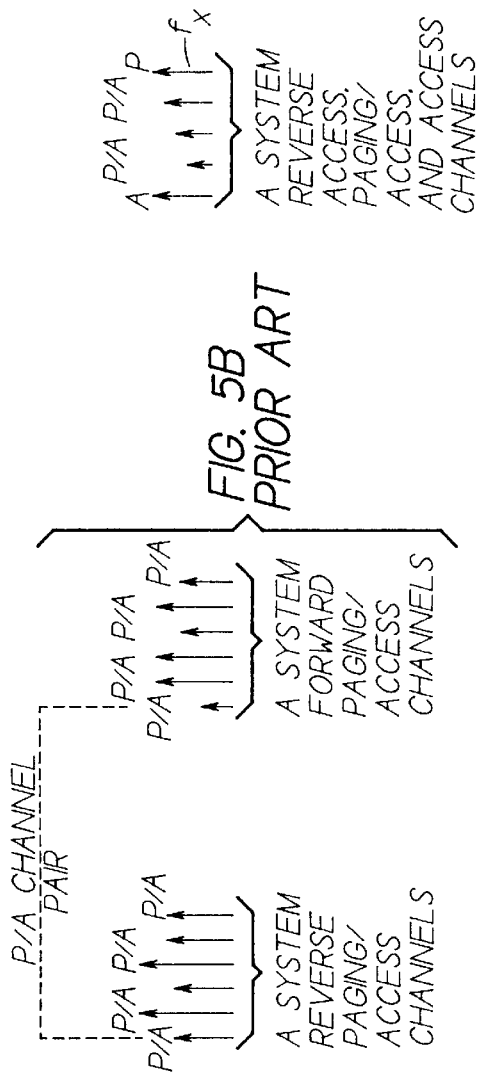

METHOD AND APPARATUS FOR REGISTERING A RADIO TELEPHONE SUBSCRIBER UNIT WHEREIN THE SUBSCRIBER UNIT REMAINS TUNED TO THE REGISTERING CHANNEL AFTER SUCCESSFUL REGISTRATION

FIELD OF THE INVENTION

This invention relates generally to cellular telephones and, in particular, to mobile radiotelephones, also referred to herein as mobile stations, that employ the same or different paging and access channels when making a registration request to a cellular system.

BACKGROUND OF THE INVENTION

In U.S. Pat. No. 5,020,091 there is described a cellular telephone communications system that includes multiple cells covering a geographical area, such as a metropolitan area. To the base station of each cell a number of frequencies are assigned, with some of the assigned frequencies being specified as control channels used for reciprocal identification between the telephones and the system. The location of the dedicated control channels in the cell's frequency spectrum identifies the type of cellular system, A or B (see, for example, EIA/TIA-553). A metropolitan area typically has one of each type of system.

A cellular radiotelephone operating in a cellular radiotelephone system that employs autonomous registration must make itself known to, or register with, the cellular system (i.e., with the MTSO). The identification typically informs the system where the radiotelephone is located in the system so that the radiotelephone can be subsequently paged when receiving a call.

In a cellular system of most interest to this invention the channel from a base station to the mobile station is referred to as the forward channel, i.e., the forward control channel and the forward voice channel. The channel from the mobile station to the base station is referred to as the reverse channel, i.e., the reverse control channel and the reverse voice channel.

The mobile station's transmitting channels are, by example, from 824.040 to 848.970 MHz and the receiving channels are, by example, from 869.040 MHz to 893.970 MHz. Further by example, the frequency 844.980 MHz is channel 666 for the mobile station's transmitter, and the frequency 889.980 MHz is channel 666 for the mobile station's receiver. When a system allocates a voice channel to the mobile station (e.g., channel 666), it allocates a frequency pair for receiving and transmitting. The frequency pair is referred to simply as channel 666. The receiving and transmitting frequencies of a given channel are always spaced apart by 45 MHz from one other.

Voice channels and access channels use both the forward and reverse channels. The system may have one or more forward control channels used for paging purposes only, and the mobile station is not allowed to transmit on the corresponding reverse channel (i.e., 45 MHz below the paging channel frequency). The forward paging channel is used only for receiving pages and orders from the base station.

However, in most cases the access channel set and the paging channel set are the same, and may comprise 21 channels (i.e., 42 frequencies). In this case the mobile station is allowed to transmit on the reverse control channels, while the corresponding forward control channels are used for paging and for sending orders to the mobile station. In this case the orders can also include messages from the base station to the mobile station, which are related to system access, e.g. registration confirmation or initial voice channel designation (in the case of a page response).

In greater detail, and referring to FIG. 5A, there is shown an exemplary mobile station transmit (TX or reverse) frequency band and an exemplary mobile station receive (RX or forward) frequency band. The depiction of FIG. 5A is based on the EIA/TIA-553 frequency band allocation (mandatory). Each band is divided into 666 frequency channels, with half of the frequency channels being assigned to the A system and the remaining half to the B system. Although not illustrated in FIG. 5A, it should be realized that additional or extended frequency bands, also described in EIA/TIA-553, could also be allocated. The total width of the mandatory band is 20 MHz+20 MHz. Each band includes a set of dedicated control channels (e.g., 21 control channels) for the A system, and a corresponding set of dedicated control channels for the B system. In the illustrated case there is a 45 MHz separation between the TX and RX channels. That is, the TX channel number 1 is 45 MHz below the RX channel 1, the TX channel number 2 is 45 MHz below the RX channel 2, etc. As such, it is useful to think of frequency channel pairs, wherein a given mobile station, when assigned to a voice channel (e.g., channel 22), would receive from the base station at a frequency of n MHz, and would transmit to the base station at a frequency of (n−45) MHz. Individual ones of the dedicated control channels are thus also a frequency channel pair. By example, dedicated control channel 1 of the B system (i.e., channel 334) is received by the mobile station from the base station at frequency n, and the mobile station transmits to the base station at frequency (n−45) MHz.

In most if not all current systems each dedicated control channel is actually a combined paging and access (P/A) channel, wherein paging messages and system access information are transmitted to the mobile station on an assigned forward dedicated control channel, and wherein the mobile station transmits access requests (e.g., call origination messages) and other information to the base station on the corresponding reverse channel of the P/A channel pair. This case is illustrated in FIG. 5B for the A system, wherein a plurality (e.g., 21) of P/A frequency channel pairs exist, individual ones of the P/A frequency channels being offset by 45 MHz from one another. In this case the set of dedicated P/A control channels may be considered to be congruent, wherein each forward P/A channel has an associated reverse P/A channel that is 45 MHz below the forward P/A channel.

It is also useful to consider the case of FIG. 5C, wherein the set of dedicated control channels may be considered to intersect or overlap. In this case only some of the dedicated control channels are P/A channels (i.e., the region of intersection of the set of paging channels with the set of access channels), while others are paging-only channels (P) and still others are access-only channels (A). This configuration could be used if, by example, it was required that the mobile station not transmit on a particular frequency within the reverse or TX band. By example, if for some reason it was required that no transmissions occur at a frequency $f_x$, then a paging-only forward channel can be established at frequency ($f_x$+45 MHz). A mobile station assigned to this paging channel will receive pages from the base station on the forward paging-only channel, will receive access information on a different forward access-only channel, and will transmit origination messages and the like on a reverse access channel that corresponds to (i.e., that is 45 MHz below) the assigned forward-only access channel (mobile stations do not transmit paging messages). In this case no mobile station will transmit at frequency $f_x$, which is the desired result.

Still another case, not illustrated, provides a set of paging-only channels and a set of access-only channels. In this case the sets of paging and access channels can be considered to be disjoint or non-overlapping. This latter case is of least interest to the teaching of this invention.

The base stations frequently transmit an Overhead Message Train (OMT). The OMT includes a System Parameter Overhead Message (SPOM) that consists of two words. The SPOM always contains System Identification (SID) information. According to current standards (e.g., EIA/TIA-553), the SPOM is transmitted every 800±300 ms. The OMT may contain additional words, such as the REGID, which in some systems is sent in, by example, every tenth OMT.

This system identification process, which takes place over a paging channel, is accomplished when the radiotelephone is powered on and receiving, but not transmitting (i.e., the radiotelephone is in an idle state).

Autonomous registration is a method by which the radiotelephone informs the system that it is active. One technique for performing autonomous registration is described in U.S. Pat. No. 4,775,999. This registration is performed at various time intervals. If the radiotelephone moves to another cellular communications system (with a corresponding change in the SID) it must register in the new system.

As is depicted in FIG. 1, a typical cellular network is divided into a number of regions (e.g., SID1–SID5) each having contiguous radio cells (shown nominally as hexagons). One region or SID may also include one or more paging areas, each encompassing one or more radio cells. One advantage of having several paging areas in one SID is that when a call to a mobile station is received in the servicing system, the paging message to the called mobile station can be transmitted to only one paging area (where the mobile station is assumed to be located), instead of being transmitted over the entire coverage of the SID. Dividing the SID into several paging areas thus enables an increase in the capacity of the cellular network, without requiring that additional SIDs be provided. This is made possible in conventional systems by using certain information that is transmitted to the mobile station with the above-mentioned OMT. Of the transmitted information, of most concern to the teaching of this invention are information units referred to as the REGID and REGINCR.

When a mobile station registers with the system it stores a value for a variable referred to as NXTREG (i.e., next registration), where the stored value of NXTREG=REGID+REGINCR as received from the OMT. By example, if the mobile station has registered into the system with REGID=1000 and REGINCR=450, it stores the value 1450 into the NXTREG memory location. The system subsequently increments REGID from 1000 to, by example, 1002, 1004, 1006, . . . , etc. When REGID reaches 1450 the mobile station registers again, and stores the NXTREG value as NXTREG=(1450+450)=1900. This process continues, with the mobile station registering every time that the received value of REGID equals or exceeds the internally maintained value of NXTREG.

In conventional practice, and when entering the system access task to perform registration, the mobile station scans its receiver to identify the two strongest received access channels. The mobile station then registers into the paging area having the strongest access channel, from which it can read data sent on an access channel. If the mobile station cannot read and decode the data successfully, it switches to the second strongest channel and tries to complete the task there.

After a successful registration, and according to conventional practice (e.g., EIA/TIA-553), the mobile station does not stay on or continue to monitor the last-identified access channel, but instead begins scanning for a new "strongest" paging channel. Depending on the location of mobile station, and provided that the paging and access channels (P/A) are the same, the new "strongest" paging channel may be the same channel, or another channel from the same paging area, or a channel from another paging area altogether.

This latter case is troublesome, since if the "strongest" channel is from a different paging area than the paging area into which the mobile station has just registered, and assuming that the mobile station is able to identify control channel signalling from the most-recently determined strongest paging channel, the mobile station enters the idle state and begins monitoring the paging channel of the "wrong" paging area. In this case, and if the mobile station is called, the mobile station is paged in the paging area into which the mobile station last registered. However, if the mobile station is instead now tuned to the paging channel of another paging area, the mobile station will not respond to the paging message that is directed to the mobile station.

Furthermore, if the mobile station enters the idle state or task in another paging area than the one within which it started the registration process, it will detect that REGID is significantly different and will begin the registration process again.

A most detrimental problem resulting from the foregoing situation is as follows. The mobile station begins the registration process from a paging area 1 and the NXTREG is calculated from the information received from the paging channel of the paging area 1. The mobile station scans for the strongest access channel and finds it from the paging area 2. The mobile station then performs registration on the access channel from paging area 2. During system access the mobile station is not specified to read the REGID and, in most cases, it would not be available during the short period used for system access. When the mobile station scans for the paging channel after system access, it may again find a channel from paging area 1. When the mobile station compares the NXTREG to the REGID, it believes that there is no reason to perform registration. However, the system believes the mobile station is listening on one of the paging area 2 channels and sends pages there. As a result, the mobile station may miss a page that is directed to it from the system.

Furthermore, while the mobile station is scanning for other "strongest" paging channels, there exists a possibility that the mobile station will miss a paging message that is addressed to it.

This problem arises most often when a mobile station is located between or along the boundary of two paging areas where different REGIDs are used. In this situation the mobile station may be able to receive approximately equally strong signals from both paging areas.

This situation could be improved by sending another page in contiguous paging areas if the mobile station does not respond to the first page. However, this approach would cause additional loading of the system, with a consequent reduction in capacity.

OBJECTS OF THE INVENTION

It is a first object of this invention to provide an improved method for registering a cellular telephone with a cellular system.

It is a second object of this invention to provide a registration method that eliminates a possibility that the cellular telephone may inadvertently tune to and monitor a paging channel from a paging area other than the paging area into which the cellular telephone has just registered.

It is a further object of this invention to reduce or eliminate the amount of paging channel scanning that is performed by a cellular telephone, thereby reducing a possibility that the cellular telephone will not receive a paging message that is directed to it.

SUMMARY OF THE INVENTION

The foregoing and other problems are overcome and the objects of the invention are realized by a registration method that operates in two different modes. In a first mode, where paging and access channels are different, the mobile station may operate in accordance with conventional practice. However, when the paging and access channels are the same the mobile station inhibits the scanning for new channels after making a successful registration to a paging area of a cellular system. Instead, the mobile station remains tuned to the channel on which the registration took place until there is some reason, other than performing the scan after registration, to terminate the monitoring of the channel. For example, the mobile station remains tuned to the channel on which the registration occurred until the channel is lost (a loss of received data or the signal strength drops below some threshold value), or the mobile station performs a call initiation, responds to a page, performs another registration, or the mobile station periodically scans (e.g., every five minutes) for other paging channels.

This teaching of this invention also applies to the case where all of the paging and access channels are not the same, but where at least some overlap (see FIG. 5C). In this case the mobile station may inhibit the scanning for new channels after making a successful registration, so long as the access channel on which the registration took place is also a paging channel.

This invention thus teaches a method for operating a radio telephone subscriber unit or mobile station to register with a cellular system. The method includes the steps of determining from registration-related information (for example, the value of REGID) that is received from the cellular system that the subscriber unit must register with the cellular system; selecting a channel on which to send a registration message to the cellular system; transmitting the registration message to the cellular system on the selected channel; determining that the registration message was accepted by the cellular system; and, for a case where the channel on which the registration message is sent is also in a paging channel set, remaining tuned to the selected channel until a receipt of next registration-related information (a next REGID) from the cellular system. For the case where the registration-related information includes a value of REGID, the method may include a further step of modifying a value of NXTREG with the received REGID and one of a received value of REGINCR or a default value of REGINCR.

BRIEF DESCRIPTION OF THE DRAWINGS

The above set forth and other features of the invention are made more apparent in the ensuing Detailed Description of the Invention when read in conjunction with the attached Drawings, wherein:

FIG. 4 is a logic flow diagram that illustrates in greater the detail the function of the Block H of FIG. 3; and FIGS. 5A–5C illustrate various conventional mobile station forward and reverse frequency bands and associated control channels, and is useful in understanding the teaching of this invention.

DETAILED DESCRIPTION OF THE INVENTION

Figure 1:
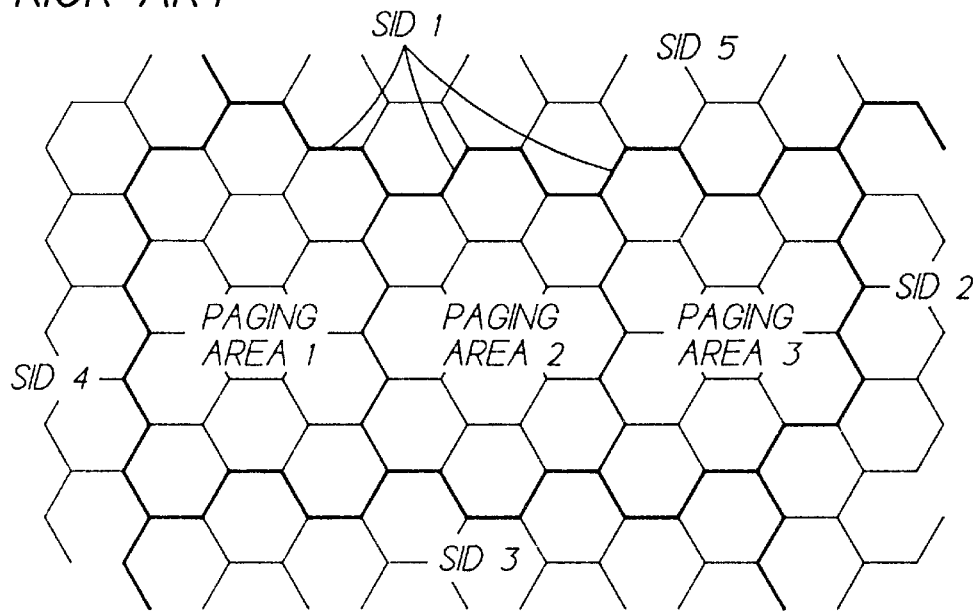
FIG. 1 illustrates a portion of a conventional cellular service area comprised of multiple SIDs, multiple paging areas within a SID, and multiple cells within a paging area.
Figure 2:
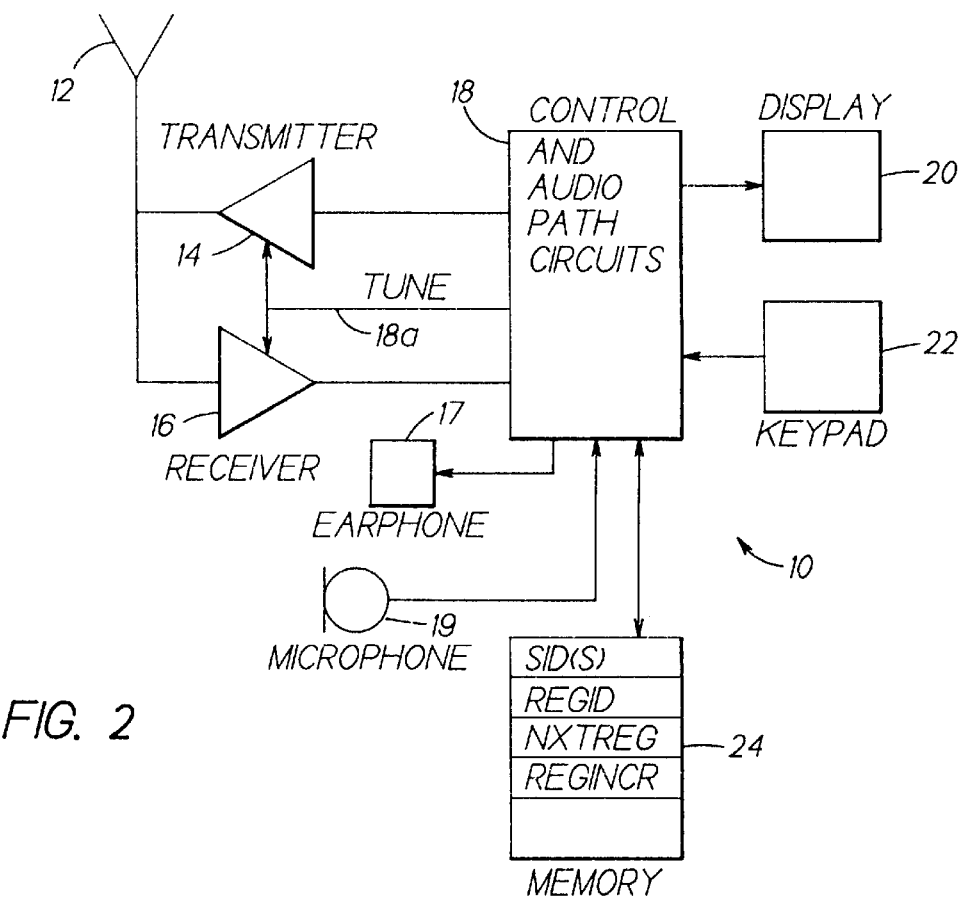
FIG. 2 is a block diagram of a radio telephone subscriber unit, or mobile station, that is constructed and operated in accordance with this invention.

Reference is made to FIG. 2 for illustrating a mobile station 10 that is suitable for practicing this invention. The mobile station 10 includes an antenna 12 for transmitting signals to and for receiving signals from a cell site or base station (not shown) of one of the cells illustrated in FIG. 1. To this end the mobile station includes a transmitter 14, a receiver 16, and a controller 18 that provides signals to and receives signals from the transmitter 14 and receiver 16, respectively. These signals include signalling information in accordance with the air interface of the cellular system (e.g., EIA/TIA-553), and also user speech and/or user generated data.

A user interface includes a conventional earphone 17, a conventional microphone 19, a display 20, and a user input device, typically a keypad 22, all of which are coupled to the controller 18. The mobile station 10 also includes a memory 24 wherein is stored a plurality of constants and variables that are used by the controller 18 during the operation of the mobile station. For example, the memory 24 stores the value of one or more SIDs, including the mobile station's home SID, a value of NXTREG, and may also store the last received value of REGID from a forward control channel, and the last received value of REGINCR. It is noted that in some systems REGINCR may not be transmitted by the base station. In this case, the mobile station uses a default value of, by example, 450 (e.g., EIA/TIA-553). An operating program for controlling the operation of controller 18 is typically stored in a separate program memory (not shown). The controller 18 outputs a signal (TUNE) 18a to the transmitter 12 and the receiver 16 that is used for varying the transmit and receive frequencies, thereby enabling the mobile station to tune to various control and voice channels. When tuning to a desired channel the transmitter 14 and receiver 16 will normally be tuned so as to be 45 MHz away from one another (see, for example, the forward and reverse P/A channel pair of FIG. 5B).

It should be understood that the mobile station 10 can be a vehicle mounted or a handheld device. It should further be appreciated that the mobile station 10 can be capable of operating with two or more air interface standards, modulation types, and access types. By example, the mobile station may be capable of operating in accordance with a frequency modulated (FM), frequency division multiple access (FDMA) transmission and reception standard, such as is found in conventional 800 MHz public cellular systems (e.g., EIA/TIA-553), and improvements and modifications thereof. For a dual mode mobile station, operation may also occur as well, when operating on an analog control channel, with a phase modulated (PM), time division multiple access (TDMA) standard (such as EIA/TIA-136 or GSM), or a code division multiple access (CDMA) standard (such as EIA/TIA IS-95). Narrow-band AMPS (NAMPS), as well as TACS phones, may benefit from the teaching of this invention.

Before describing the method of this invention in further detail, it should be noted that the individual REGIDs of paging areas within a SID should differ by an amount greater than REGINCR, otherwise the mobile station may not invoke the registration task when entering a new paging area. REGINCR can be, and usually is, the same for all paging areas. Furthermore, if the system does not transmit a value for REGINCR, the mobile station may employ a default REGINCR value (e.g., 450) when calculating the value of NXTREG.

Figure 3:
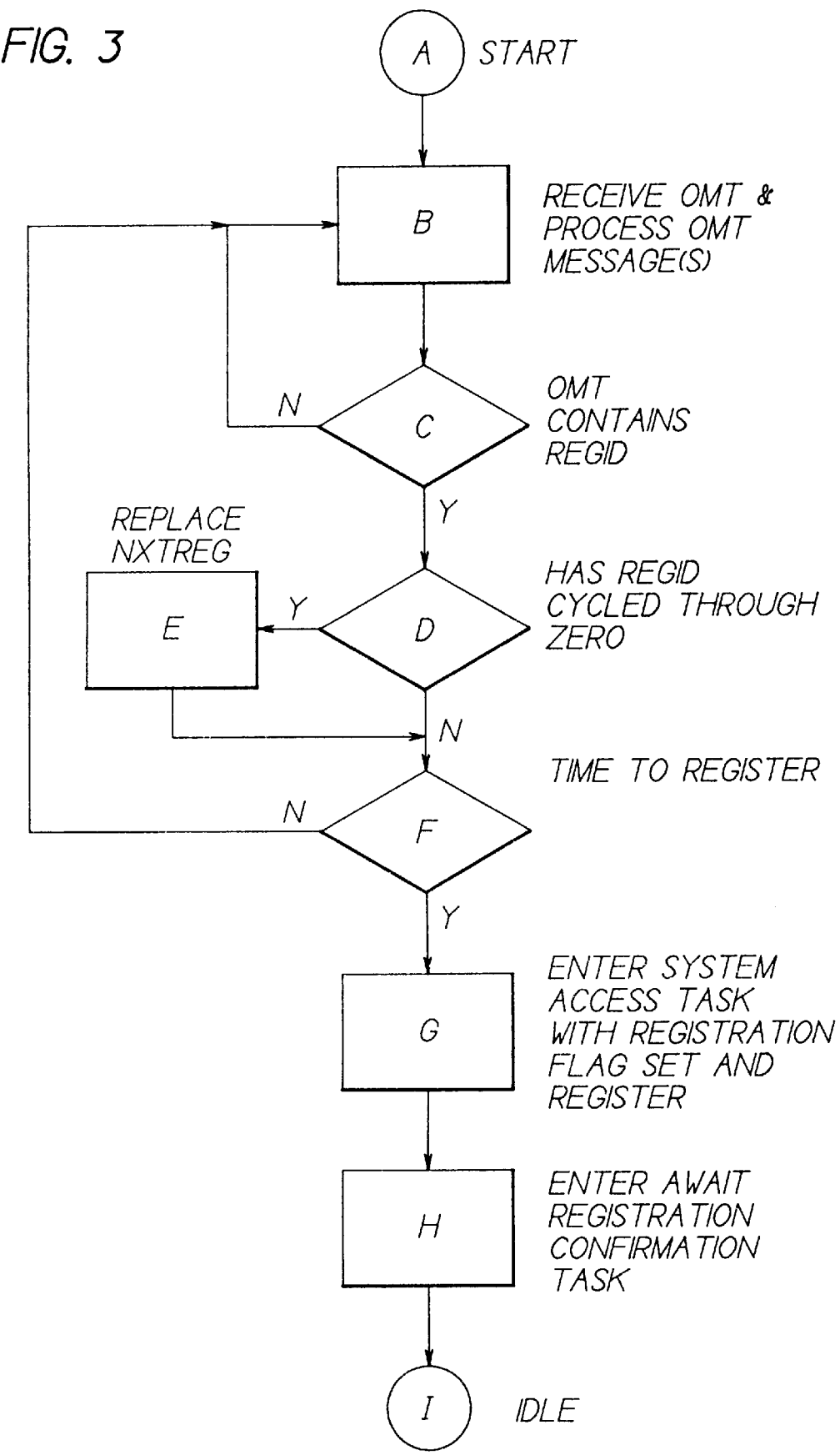
FIG. 3 logic flow diagram that illustrates a method of this invention.

Referring now to FIG. 3, the method starts at Block A, and at Block B the mobile station 10 receives an OMT on the forward control channel and begins to process the OMT message(s). At Block C the mobile station 10 determines if the OMT contains a REGID message. If not, control passes back to Block B to continue processing the OMT messages. If yes at Block C, that is the OMT contains a REGID message, and in response thereto, the mobile station 10 at Block D reviews the stored NXTREG value to determine if REGID has cycled through zero. If NXTREG is greater than or equal to (REGID+REGINCR+5) then control passes to Block E where NXTREG is replaced by the greater of zero and the value of (NXTREG$-2^{20}$), otherwise the mobile station 10 does not change the value of NXTREG and control passes to Block F. At Block F the mobile station 10 compares REGID with NXTREG. If REGID is not equal to or greater than NXTREG control passes back to Block B. That is, it is not time for the mobile station 10 to register. If the mobile station determines at Block F that it is time to register, and if autonomous registration is enabled, the mobile station 10 at Block G enters the System Access task with a registration flag set. The mobile station 10 sends a registration message to the system while in Block G. After sending the registration message at Block G, the mobile station 10 enters an Await Registration Confirmation Task at Block H and eventually enters Block I to complete the registration process.

This invention pertains most particularly to the mobile station activity while performing the Await Registration Confirmation task at Block H, and for the cases illustrated in FIGS. 5B and 5C wherein the paging and access channel sets are either congruent or intersecting (overlapped).

Referring now to FIG. 4, the steps executed by the mobile station 10 while performing the Block H are shown in greater detail. At Block H1 the mobile station 10 starts the Await Registration Confirmation task. At Block H2 the mobile station 10 determines if confirmation is received and thus if the last-made registration is successful. If no, the mobile station exits Block H (e.g., EIA/TIA-553, Sec. 2.6.3.10, Action on registration failure). Assuming that the registration attempt was successful, the mobile station 10 then executes Block H3.

In accordance with an aspect of this invention, at Block H3 the mobile station 10 determines if the paging and access channels belong to a same set. That is, if the sets of paging and access channels are congruent P/A channels as depicted in FIG. 5B. This can be accomplished by making a determination if (FIRSTCHP$_s \neq$ FIRSTCHA$_s$) or (LASTCHP$_s \neq$ LASTCHA$_s$). It is also within the scope of the invention to instead determine if the sets of paging and access channels are at least intersecting (FIG. 5C), and if the mobile station has been registered on one of the P/A channel pairs within the region of intersection. If no, at Block H4 the mobile station 10 continues in a conventional fashion and enters the Serving System Determination Task (e.g., EIA/TIA-553, Sec. 2.6.3.12) and then usually continues to the Paging Channel Selection task (e.g., EIA/TIA-553, Sec. 2.6.1.2) where the mobile station 10 re-scans and reads the OMT from the strongest paging channels between FIRSTCHPs and LASTCHPs.

If yes at Block H3, the mobile station 10 receives (within three seconds) the OMT from the current paging channel. If successful at Block H6, control passes to Block H9 where the mobile station 10 verifies and processes the overhead information. At Block H10 the mobile station 10 waits to receive a REGID (e.g., every tenth OMT contains a REGID) and then processes the OMT information (e.g., EIA/TIA-553, Sec. 2.6.2.1, Response to Overhead Information task). When receiving the REGID, the mobile station 10 updates NXTREG accordingly (Block H11). It can be noted that Blocks H9–H11 may be considered as part of the Idle task.

If the mobile station 10 is not successful in reading the OMT at Block H6, control passes instead to Block H7 where the mobile station 10 checks the serving system status and then enters Block H8 to perform the Scan Dedicated Control Channels task (e.g., EIA/TIA-553, Sec. 2.6.1.1.1).

It will be appreciated that the method depicted in FIG. 4 eliminates the unnecessary scanning that occurs in conventional practice. By example, in conventional practice, and after determining that the mobile station is on the preferred system, the mobile station 10 instead enters a Paging Channel Selection Task (e.g., EIA/TIA-553, Sec. 2.6.1.2) where the mobile station re-scans and reads the OMT from the strongest paging channel between FIRSTCHPs and LASTCHPs. As was indicated previously, this unnecessary scanning can result in the loss of pages and other messages that are directed to the mobile station 10 from the paging area into which it has just registered.

The mobile station 10 in accordance with this invention overcomes these problems by staying on the current P/A channel (Blocks H5, H9) so as to usually read at least one REGID from the current P/A channel. The mobile station 10 furthermore makes the determination (Block H3) as to whether the paging and access channels are P/A channels, and are thus either congruent (FIG. 5B) or at least overlapping (FIG. 5C). For the case of FIG. 5C it is assumed that the mobile station is registered on one of the overlapping P/A channels. If not, then control would pass instead to Block H4 from Block H3.

As was indicated above, in most if not all currently implemented systems the paging channel set and the access channel set are the same. For registration purposes, the mobile station 10 scans for the strongest access channel. Since the registration process may take only approximately one second, it is clear that there is no benefit in then subsequently scanning for another paging channel after registration, and the mobile station of this invention eliminates this unnecessary scanning when the access channels and paging channels are the same.

In accordance with an aspect of this invention, the mobile station 10 instead remains tuned to same P/A channel that it just successfully registered on until a next REGID message is received from the forward control channel of the base station.

Another benefit of the teaching of this invention is that useless, extra registrations can be avoided by updating NXTREG from the first REGID received on the P/A channel after registration.

It may seem apparent that the value of the CPA bit, which is also received in the OMT, could be used for determining if the set of access channels and the set of paging channels are both in the control channel set. However, in the preferred embodiment of this invention the CPA bit is not used for this purpose. That is, CPA=1 does not necessarily mean that the paging/access channel sets are the same. By example, if the mobile station is operating in its' home system, FIRSTCHPs and FIRSTCHAs might be different, in that FIRSTCHA (the number of the first control channel used for accessing the system) is always 334 for B system and 333 for A system, but FIRSTCHP (the number of the first control channel used for paging mobile stations) is a value pre-programmed into the mobile station and which can have a value that ranges from 1 to 1023. Also, the number of paging channels (designated in the N field in the system parameter overhead message) can be different from the number of access channels (designated in the CMAX field in the system parameter overhead message).

Although described above in the context of a mobile station that determines if the paging channel set and the access channel set are the same (e.g., congruent as in FIG. 5B), the invention applies as well to the situation of FIG. 5C where there is an overlap between paging and access channels, but not all of the paging channels are also access channels. So long as the strongest access channel is also the paging channel, then the method of this invention can be employed to advantage.

The following is noted with respect to the overlap case of FIG. 5C. For registration, the mobile station 10 searches for the strongest access channel from the access channel set. After registration, the mobile station 10 may check to determine if the access channel that it used for registration is also included in the paging channel set. If so, the mobile station 10 may stay on the channel to be sure that it is receiving pages from the paging area within which it performed the registration.

Furthermore, and although described in the context of paging and access channels, it should be realized that the term "access channel" should be broadly read to include any channel on which the mobile station 10 may access the cellular system (e.g., for call origination, registration, response to pages, order responses, etc.), and the term "paging channel" should be broadly read to include any channel on which pages are sent to the mobile station.

The teaching of this invention should also not be construed to be limited for use with only one communications standard or specification, such as EIA/TIA-553.

Thus, the invention has been particularly shown and described with respect to preferred embodiments thereof, it will be understood by those skilled in the art that changes in form and details may be made therein without departing from the scope and spirit of the invention.

What is claimed is:

1. A method for operating a radio telephone subscriber unit to register with a cellular system, comprising the steps of:
   determining from registration-related information that is received from the cellular system that the subscriber unit must register with the cellular system;
   transmitting the registration message to the cellular system on a selected channel;
   determining that the registration message was accepted by the cellular system as a successful registration; and
   during initialization operations invoked after the successful registration, and for a case where the channel on which the registration message is sent is also in a paging channel set, remaining tuned to the selected channel, without rescanning for a dedicated control channel or for a paging channel, until a receipt of next registration-related information from the cellular system.

2. A method as set forth in claim 1, wherein the registration-related information includes a value of REGID, and further comprising the step of modifying a maintained value of NXTREG with the value of REGID received after registration and with a received value of REGINCR.

3. A method as set forth in claim 1, wherein the registration-related information includes a value of REGID, and further comprising the step of modifying a maintained value of NXTREG with the value of REGID received after registration and with a default value of REGINCR.

4. A method for operating a radio telephone subscriber unit to register with a cellular system, comprising the steps of:
   determining from registration-related information that is received from the cellular system that the subscriber unit must register with the cellular system;
   transmitting the registration message to the cellular system on an access channel;
   determining that the registration message was accepted by the cellular system as a successful registration; and
   during initialization operations invoked after the successful registration, and for a case where a set of access channels are congruent with a set of paging channels, remaining tuned to the access channel, without rescanning for a dedicated control channel or for a paging channel, until a receipt of next registration-related information from the cellular system.

5. A method as set forth in claim 4, wherein the registration-related information includes a value of REGID, and further comprising the step of modifying a maintained value of NXTREG with the value of REGID received after registration and with a received value of REGINCR.

6. A method as set forth in claim 4, wherein the registration-related information includes a value of REGID, and further comprising the step of modifying a maintained value of NXTREG with the value of REGID received after registration and with a default value of REGINCR.

7. A method for operating a radio telephone subscriber unit to register with a cellular system, comprising the steps of:
   determining from registration-related information that is received from the cellular system that the subscriber unit must register with the cellular system;
   transmitting the registration message to the cellular system on a selected channel;
   determining that the registration message was accepted by the cellular system as a successful registration; and
   during initialization operations invoked after the successful registration, and for a case where the channel on which the registration message is sent is also in a paging channel set, remaining tuned to the selected channel, without rescanning for a dedicated control channel or for a paging channel, until a receipt of a REGID message from the cellular system.

8. A method as set forth in claim 7, and further comprising the step of modifying a maintained value of NXTREG with the value of REGID and with a received value of REGINCR.

9. A method as set forth in claim 7, and further comprising the step of modifying a maintained value of NXTREG with the value of REGID and with a default value of REGINCR.

10. A method for operating a radio telephone subscriber unit to register with a cellular system, comprising the steps of:
   determining from registration-related information that is received from the cellular system that the subscriber unit must register with the cellular system;

transmitting the registration message to the cellular system on an access channel;

determining that the registration message was accepted by the cellular system as a successful registration; and during initialization operations invoked after the successful registration, and for a case where a set of access channels are congruent with a set of paging channels, remaining tuned to the access channel, without rescanning for a dedicated control channel or for a paging channel, until a receipt of a REGID message from the cellular system.

11. A method as set forth in claim 10, and further comprising the step of modifying a maintained value of NXTREG with the value of REGID and with a received value of REGINCR.

12. A method as set forth in claim 10, and further comprising the step of modifying a maintained value of NXTREG with the value of REGID and with a default value of REGINCR.

13. A method for operating a radio telephone subscriber unit to register with a cellular system having at least one paging channel and at least one access channel, the cellular system transmitting values to the subscriber unit including at least a value of REGID, and the subscriber unit maintaining a value of NXTREG as a function of REGID, comprising the steps of:

receiving a value of REGID and comparing it to the value of NXTREG; and initiating a registration task if the value of REGID is greater than or equal to the value of NXTREG or REGID is substantially smaller than REGID from a last registration, the registration task including the steps of sending a registration message on a strongest access channel; identifying a message of successful registration; and during initialization operations invoked after the successful registration, and for a case wherein the access channel is also a paging channel, remaining tuned to the channel, without rescanning for a dedicated control channel or for a paging channel, until one REGID is received after registration.

14. A method as set forth in claim 13, and further comprising the step of modifying a maintained value of NXTREG with the value of REGID and with a received value of REGINCR.

15. A method as set forth in claim 13, and further comprising the step of modifying a maintained value of NXTREG with the value of REGID and with a default value of REGINCR.

16. A method for operating a radio telephone subscriber unit to register with a cellular system having at least one paging channel and at least one access channel, the cellular system transmitting values to the subscriber unit including a value of REGID, and the subscriber unit maintaining a value of NXTREG as a function of REGID, comprising the steps of:

receiving a value of REGID and comparing it to the value of NXTREG; and initiating a registration task if the value of REGID is greater than or equal to the value of NXTREG or REGID is substantially smaller than REGID from a last registration, the registration task including the steps of:

scanning paging channels to select a strongest paging channel;

during initialization operations invoked after a successful registration, and for a case where the strongest paging channel is also an access channel, sending a registration message on the channel;

remaining tuned to the channel, without rescanning for a dedicated control channel or for a paging channel, until one REGID is received after registration; and modifying the value of NXTREG with the REGID and with a received value of REGINCR.

17. A method for operating a radio telephone subscriber unit to register with a cellular system having at least one paging channel and at least one access channel, the cellular system transmitting values to the subscriber unit including a value of REGID, and the subscriber unit maintaining a value of NXTREG as a function of REGID, comprising the steps of:

receiving a value of REGID and comparing it to the value of NXTREG; and initiating a registration task if the value of REGID is greater than or equal to the value of NXTREG or REGID is substantially smaller than REGID from a last registration, the registration task including the steps of:

scanning paging channels to select a strongest paging channel;

during initialization operations invoked after a successful registration, and for a case where the strongest paging channel is also an access channel, sending a registration message on the channel;

remaining tuned to the channel, without rescanning for a dedicated control channel or for a paging channel, until one REGID is received after registration; and modifying the value of NXTREG with the REGID and with a default value of REGINCR.

18. A radio telephone subscriber unit comprising a transmitter, a receiver, and a controller coupled to said transmitter and receiver, said radio telephone subscriber unit being capable of registering with a cellular system having at least one paging channel and at least one access channel, the cellular system transmitting values to said subscriber unit including at least a value of REGID, said subscriber unit further comprising a memory for storing a value of NXTREG that is determined by said controller as a function of at least REGID, said controller further comprising means for receiving a value of REGID from said receiver and for comparing the value of REGID to the stored value of NXTREG; and means for initiating a registration task based on the comparison; said controller executing the registration task by controlling said receiver to scan forward access channels to select a strongest access channel and including means for controlling said transmitter to transmit a registration message on a reverse access channel; said controller being responsive to an indication that the registration message was successful and to a determination that said access channel is also a paging channel, for remaining tuned to said channel, without rescanning for a dedicated control channel or for a paging channel, until one REGID is received after registration.

19. A subscriber unit as set forth in claim 18, wherein said controller further comprises means for modifying the maintained value of NXTREG with the received value of REGID and a received value of REGINCR.

20. A subscriber unit as set forth in claim 18, wherein said controller further comprises means for modifying the maintained value of NXTREG with the received value of REGID and a default value of REGINCR.

* * * * *